United States Patent
Mora et al.

[19]

[11] Patent Number: 6,161,113
[45] Date of Patent: Dec. 12, 2000

[54] COMPUTER-AIDED PROJECT NOTEBOOK

[75] Inventors: Pamela S. Mora; Bruce E. Barlow; Sydney R. Limerick, all of Plano; Jackie R. Kennett, Grapevine; Bruce R. Beede, The Colony, all of Tex.

[73] Assignee: Texas Instruments Incorporated, Dallas, Tex.

[21] Appl. No.: 09/009,166

[22] Filed: Jan. 20, 1998

Related U.S. Application Data

[60] Provisional application No. 60/036,128, Jan. 21, 1997.

[51] Int. Cl.[7] .............................. G06F 15/00; G06F 17/00
[52] U.S. Cl. ........................................... 707/505; 707/517
[58] Field of Search ........................... 707/505, 506–508, 707/513, 500, 515, 526; 345/335, 329, 330, 331, 332, 217, 204–205, 218–220, 231, 201; 709/217, 200, 203, 204–205, 218–220, 231, 201

[56] References Cited

U.S. PATENT DOCUMENTS

| | | |
|---|---|---|
| 5,671,428 | 9/1997 | Muranaga et al. ...................... 345/329 |
| 5,754,782 | 5/1998 | Masada .................................... 709/213 |
| 5,778,368 | 7/1998 | Hogan et al. ............................. 707/10 |
| 5,790,847 | 8/1998 | Fisk et al. .................................. 707/4 |
| 5,819,243 | 10/1998 | Rich et al. ................................ 706/11 |
| 5,931,917 | 8/1999 | Nguyen et al. ......................... 709/250 |
| 5,950,009 | 9/1999 | Bortnikov et al. ...................... 395/709 |

*Primary Examiner*—Hosain T. Alam
*Assistant Examiner*—Alford W. Kindred
*Attorney, Agent, or Firm*—Robert L. Troike; Frederick J. Telecky, Jr.

[57] ABSTRACT

A method of providing a computer-aided project notebook for use on a computer system programmed with collaboration software (11). A database (11b) stores forms for documents comprising the notebook. The forms are categorized into views, such as a methodology view that sorts documents by status (FIG. 3). Methodology documents have status fields, into which a user may enter status data. After status data is entered, the document will appear in the correct view (FIG. 5). Other features of the notebook are document interconnectivity, shared fields, trace maps, and document access especially designed for project development.

15 Claims, 7 Drawing Sheets

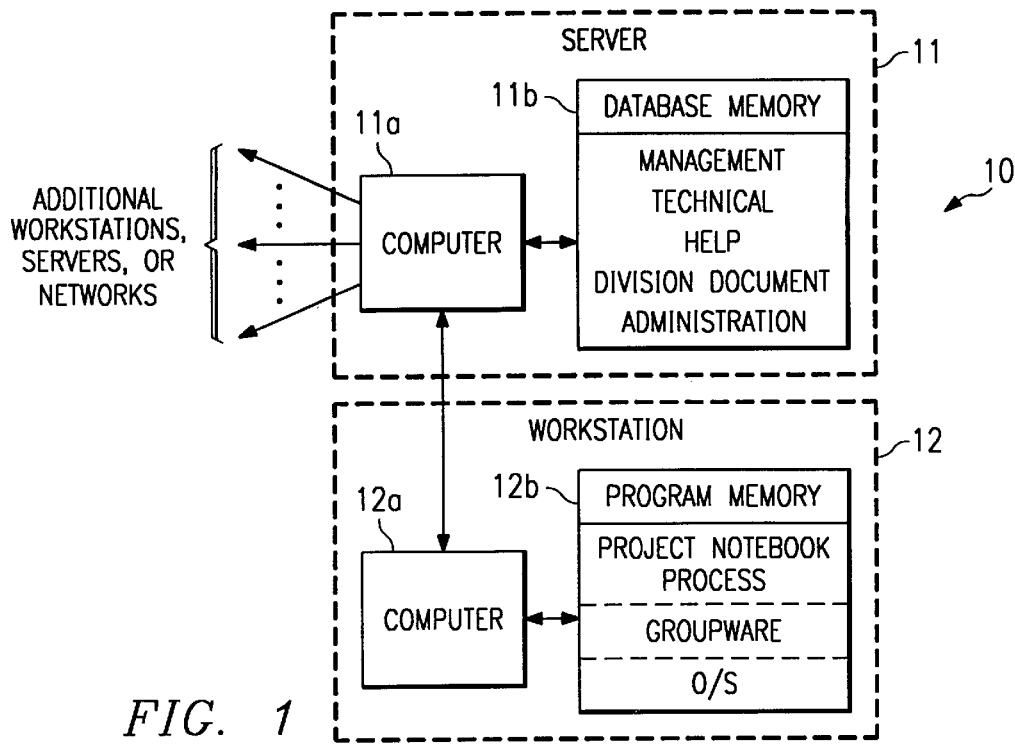

FIG. 1

| | Analyst. This person will have the authorization to approve the Application Architecture Analyst section of document approvals, reviews, and ATPs. | disp_9 |
|---|---|---|
| TEAM | This field contains the TEAM, which includes anyone with permission to update documents prior to a baseline. Entering the null ("") value will allow anyone in the TI Notes Name and Address book to update documents. | TEAM<br>disp_10 |
| Customer | This field contains the name of the Customer Representative. This person will have the authorization to approve the Customer section of document approvals, reviews, and ATPs. | Customer<br>disp_11 |

Project Assignments

FIG. 5

COMPUTER-AIDED PROJECT NOTEBOOK

This application claims benefit of provisional application Ser. No. 60/036,128, filed Jan. 21, 1997.

TECHNICAL FIELD OF THE INVENTION

The present invention relates to computer software, and more particularly to a method of providing a computer-aided project notebook.

BACKGROUND OF THE INVENTION

"Collaboration software", also referred to as "groupware", is a type of computer software designed to enable workgroups and individuals to collaborate and share knowledge regardless of geographic boundaries and time restrictions. Groupware is characterized by e-mail facilities, which permit users to communicate from a workstation with everyone in the groupware environment. The user can also communicate with individuals in other groupware domains, or have connections with service providers such as CompuServe, the Internet, and others. In addition to e-mail, groupware permits users to access, track, share and organize various other types of information through LANs, WANs, and dial-up telephone lines.

An example of groupware is Lotus Notes, a product of Lotus Development Corporation. The Notes groupware supports a wide variety of data formats and many computer, telecommunications, and messaging industry standards. Notes empowers personnel to manage and organize tasks from a central location, using a single source of information that is shared among all personnel.

Groupware is characterized by four primary components: documents, document routing, databases, and replication. Documents are electronic forms that can be completed, stored, and routed. Documents can be routed to a designated person, group, or location with the document routing facility. Databases store, manage, and display documents. Database copies (replicas) are synchronized with the replication engine.

SUMMARY OF THE INVENTION

One aspect of the invention is a method of providing a computer-aided project notebook, for use with collaboration software. A database is created that stores forms for documents to be completed by project members. These forms provide a step-by-step guide to project documentation, but are selectable so that a notebook can be tailored for a particular project. The forms are categorized into views, each view having different view selection criteria. At least one view is a methodology view, whose selection criteria permits a user to view documents sorted according to status, such as in-work or pending approval. The notebook software includes a macro that enables the user to change a document's status.

The notebook software includes a variety of user interface features and macros. For example, programming is provided for relating documents to each other and for re-using data that has been entered in one document. Project requirements may be traced with a variety of trace maps, which provide forward as well as reverse tracing. Document approval is facilitated with approval sections associated with each methodology document.

Some notebook tasks, such as interrelating forms, are pre-defined and embedded in the notebook software in a manner that is transparent to the users. Other notebook tasks, such as changing document status, are easily accomplished by the user with pre-defined menus, prompts, and macros.

The documents are located in a central location and are categorized so that the notebook enables a business enterprise to follow a standard methodology for its projects. The notebook outlines this methodology, and permits interactive use as the project develops and the notebook is filled in.

Documents may be stored in different databases according to the type of documentation, e.g., management versus technical. Within a database, each category of documents is associated with a view that provides appropriate search criteria for that category. Thus, documents are easy to locate, based on pre-determined selection criteria.

An advantage of the invention is that it provides forms for documenting all aspects of a project. Within a given organization, all projects may be consistently documented. In short, the notebook process provides a standardized, easy to use, project development process.

BRIEF DESCRIPTION OF THE DRAWINGS

FIG. 1 illustrates a computer system programmed to generate and interactively maintain a project notebook in accordance with the invention.

FIG. 5 illustrates a Project Assignments document and the use of shared fields.

DETAILED DESCRIPTION OF THE INVENTION

Figure 2:
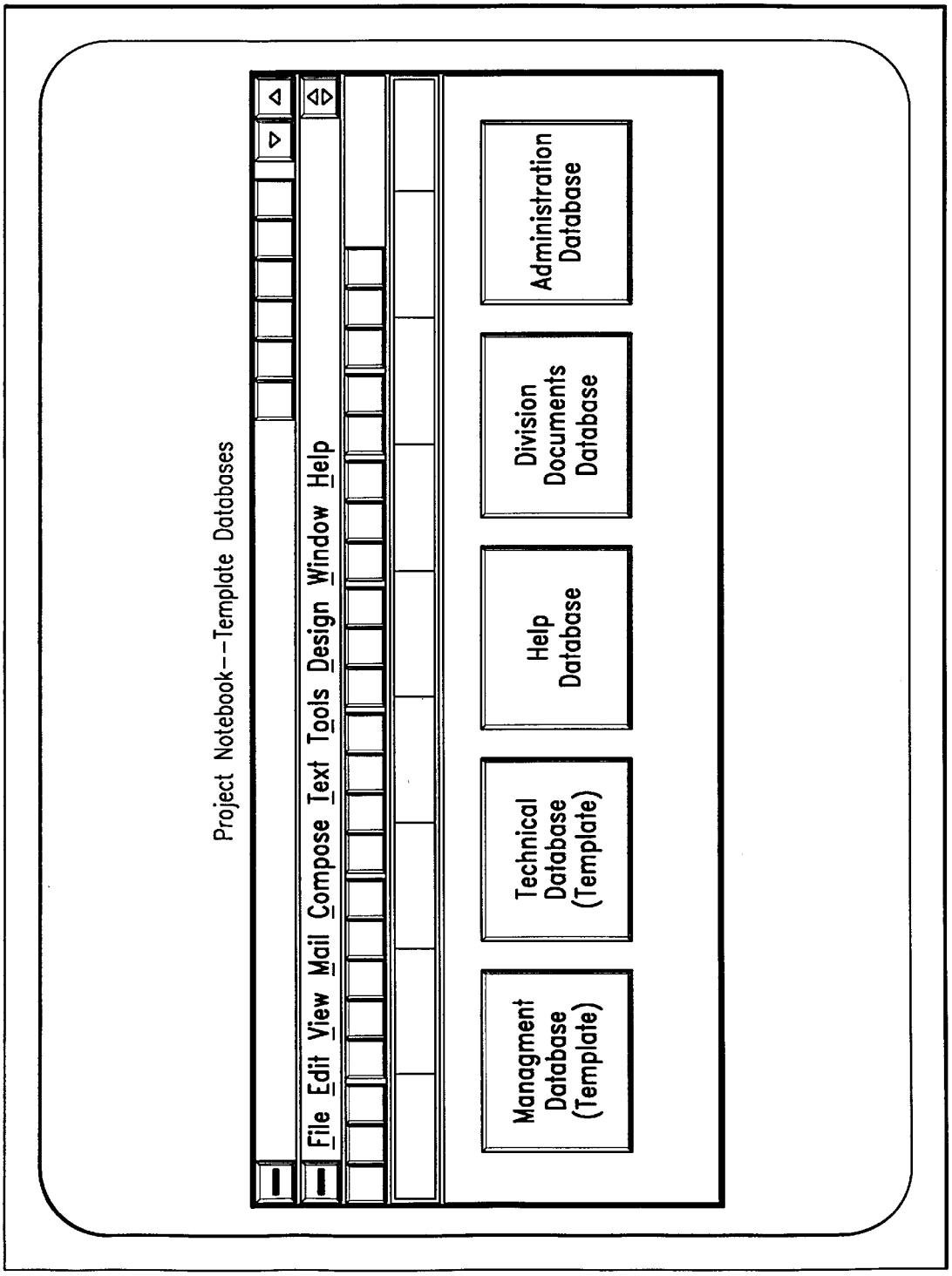
FIG. 2 illustrates a database selection menu.

The invention described herein is directed to computer programming and data that generate and maintain a project notebook. The programming and data in accordance with the invention are collectively referred to herein as "notebook software". The notebook software is a tool for end-users, presenting a user interface that comprises a set of fill-in-the blank forms in a sequential order. Various menus and other windows-type user prompts, such as buttons and dialog boxes, prompt the user to enter data when appropriate and into the appropriate document.

The software guides users in assembling documentation, in notebook form, for a project that the users are collectively undertaking. The software permits users to fill in, modify, approve, baseline, and version all documents associated with a particular project. The method of generating the notebook and interactively receiving and processing user data is referred to herein as the "notebook process".

The method aspects of the invention are the providing of the notebook software (programming and data) that implement the notebook process. The notebook programming is designed to be executed with underlying collaboration software, which may provide a set of commands for the notebook programming. For example, in the case of the Lotus Notes collaboration software, the programming may be in the form of macros or a script language. In other words, the notebook software is an "add-on" with respect to the collaboration software.

Notebook Databases and Documents

FIG. 1 illustrates a computer system 10 that stores the notebook software and executes the notebook process in accordance with the invention. System 10 is comprised of a server 11 in data communication with a number of workstations 12, via some sort of protocol such as that provided by a LAN or WAN connection. Server 11 may be connected to other servers, as part of either a flat or hierarchal network structure. System 10 may also be part of a larger network via external connections to the Internet or commercial on-line service providers. Thus, in general, server 11 accommodates external connections to other servers or networks as well as access to remote workstations.

Server 11 is comprised of a computer 11a, which, in addition to its other server tasks, maintains a notebook database 11b. Notebook database 11b is comprised of five databases: a Management database, a Technical database, a Division Documents database, an Administration database, and a Help database. Except for the Help database, each of these databases contains forms for documents to be filled in by various users, who may have varying roles in a business enterprise.

In general, the Management database stores forms for documenting management information. The Technical database stores forms for documenting technical information. As explained below, the forms stored in the Management and Technical databases may be copied and reused for a number of different projects. The Division Documents database stores forms for documenting policies and procedures common to project development by a particular enterprise. The Administration database stores forms for documenting various projects that use the project notebook. The Help database provides user information for using the other databases.

Each workstation 12 is comprised of a computer 12a and associated memory 12b. Computer 12 is a conventional workstation, storing and executing an operating system and collaboration software of the type described in the Background. Computer 12 also stores and executes the programming for the notebook software in accordance with the invention.

Computer systems 11a and 12a each have a processing unit with at least one processor, internal memory, and appropriate I/O (input/output) components. An example of a processing unit is a personal computer, such as that manufactured by International Business Machines. A memory, such as a hard disk drive, stores programming executed by processing unit and data operated on during program execution. An input device, such as a keyboard, is used to enter data. Other input devices could be used, such as voice recognition devices. Also, multiple input devices could be used, such as is usually the case with a trackball or other pointing device. An output device, such as a display, displays whatever user interface is appropriate for the data being entered, accessed, or operated on.

FIG. 2 illustrates a database selection menu 20 that is part of the user interface for the notebook process. As illustrated, the interface is in a windows type format. Menu 20 has an icon for each of the databases in database 11b, namely the Management, Technical, Help, Administration, and Division Document databases.

Documents in database 11b may be generic for all types of projects, or may be designed for use with projects of a certain type. In the example of this description, the project notebook and process are designed for computer software development projects. Many of the documents described herein comply with methodology of the Software Engineering Institute (SEI) capability maturity model. Appendices A and B describe various documents that may be included in the Management and Technical databases, respectively.

Document Composing

The project notebook forms may be pre-composed or user-composed. Both types of forms are stored in database 11 in template form, but vary with respect to their initial creation. In general, the notebook software permits tailoring of the documents to be included, but distinguishes between Methodology documents (which are pre-composed) and other documents (which are user-composed).

Pre-composed forms provide a basic sequential structure for project documentation. These forms are stored as Methodology documents in the Management and Technical databases. These forms are included in the notebook upon initialization of a particular project, and are immediately available to the user via a menu selection.

User-composed forms are added to the notebook in response to the user's selection from a Compose menu. User-composed forms include forms for meeting agendas, action items, requirements, and test cases. User-composed forms may stand alone or may have a many-to-one relationship to other documents. As an example of the latter, many user-composed documents may be related to a single Methodology document and may be created an indefinite number of times. A specific example is a meeting agenda document, which may be created for any meeting at any phase of project development. A Compose menu lists a Document category for generic documents, as well as various categories of user-composed forms.

Each pre-composed document contains a field that identifies it as a Methodology document. After being composed, each user-composed form also contains a field that identifies it as belonging to a particular View.

Notebook Views

The forms in the Management and Technical databases of database 11b are categorized into various categories, with a "view" for each category. As in conventional groupware, a "view" contains a set of documents that are sorted by a particular criteria.

Figure 3:
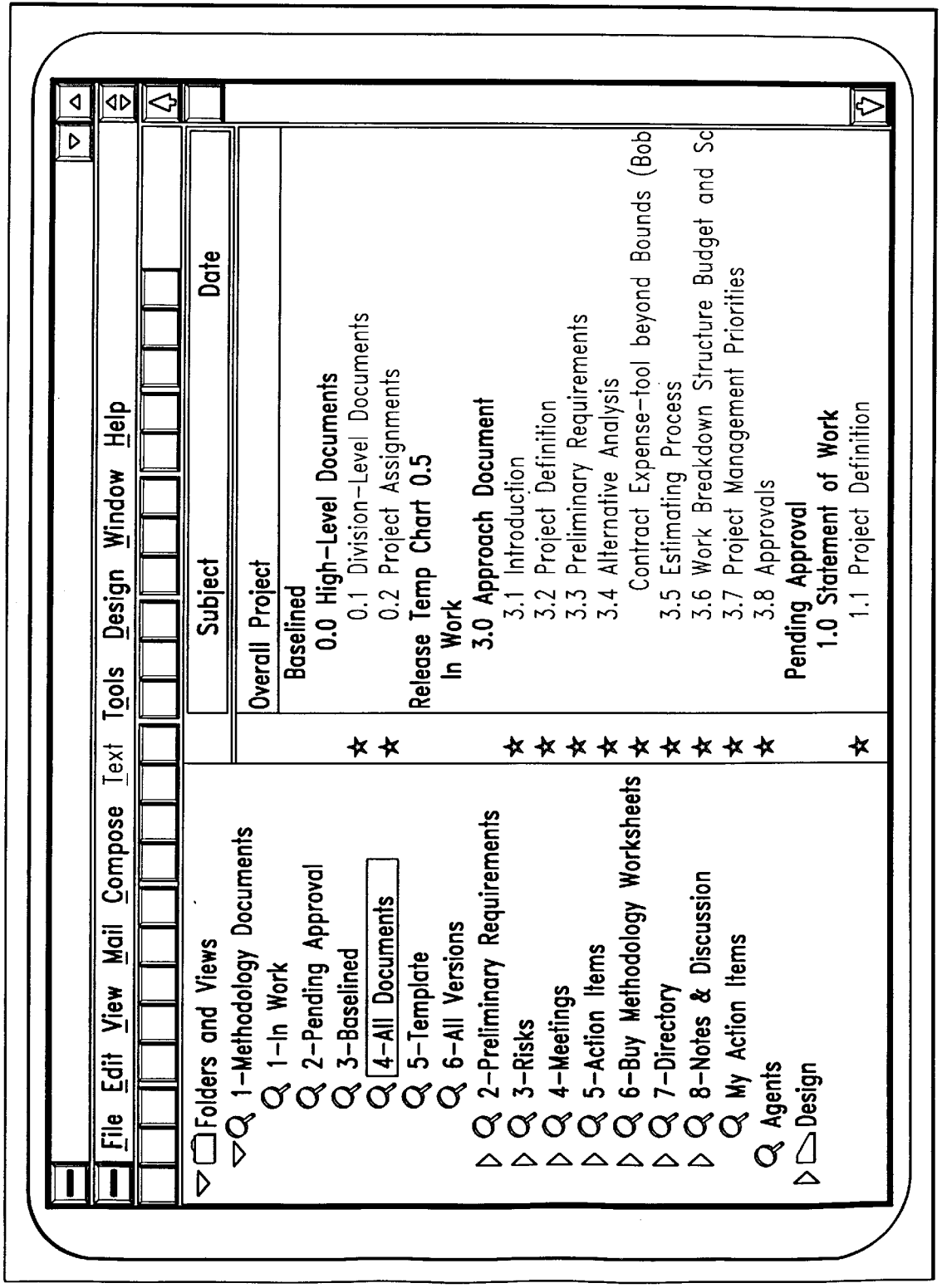
FIG. 3 illustrates the views for documents in the Management database.

FIG. 3 illustrates the views available for documents in the Management database. These views are Methodology documents, Preliminary Requirements, Risks, Meetings, Action Items, Buy Methodology worksheets, Directory, and Notes and Discussions. Each view permits the user to access documents in the associated category according to selected criteria. The selection criteria for the Methodology view are shown in FIG. 3. As illustrated, the Methodology view can be used to access documents selected by their status, such as "in work" or "pending approval". Appendix C is a more detailed list of the Management database views and the selection criteria for each view. The use of document status data is described in further detail below.

Figure 4:
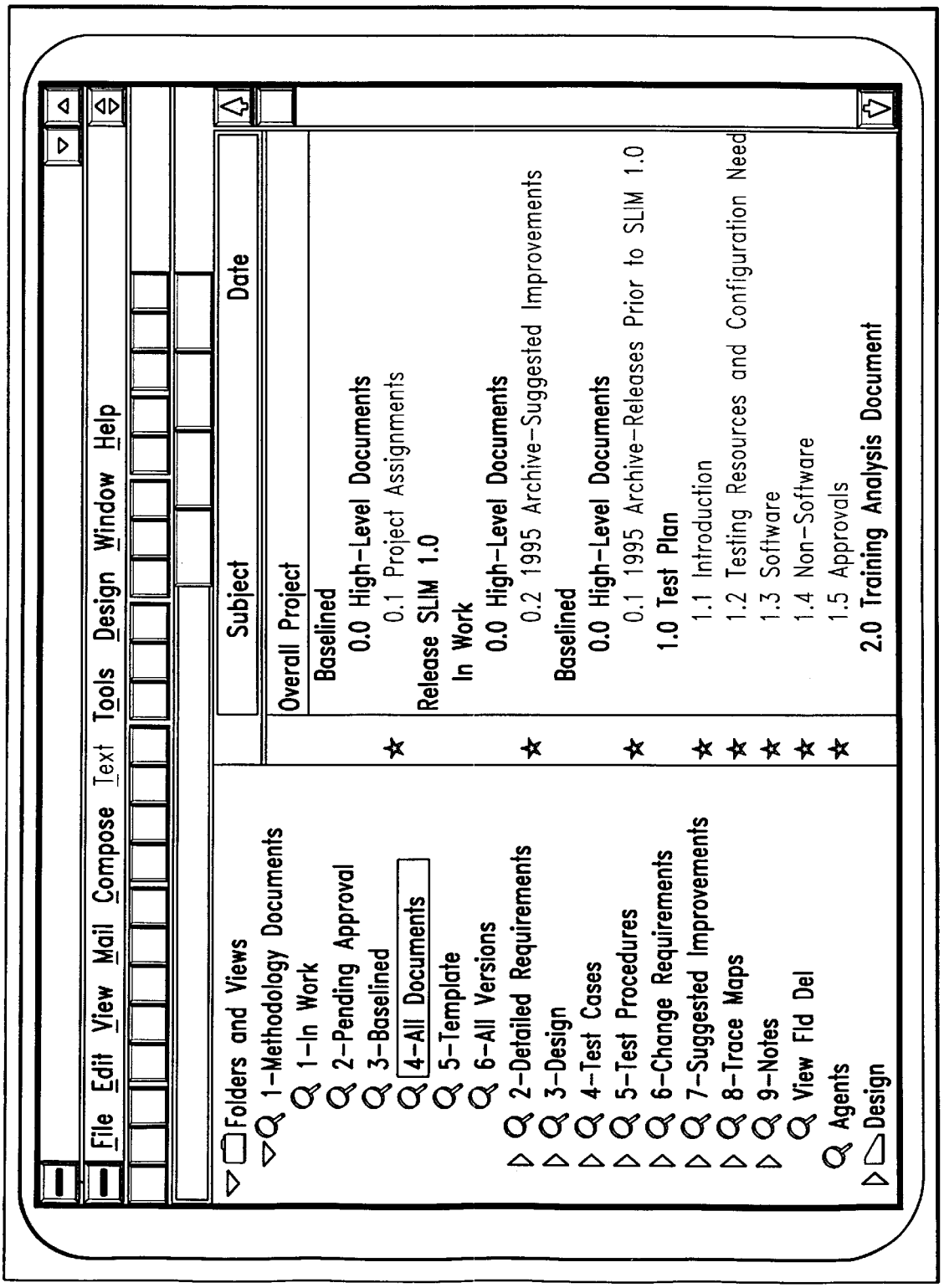
FIG. 4 illustrates the views for documents in the Technical database.

FIG. 4 illustrates the views provided by the Technical database. These views are Methodology, Detailed Requirements, Design, Test Cases, Test Procedures, Change Requests, Trace Maps, and Notes. The selection criteria for the Methodology view are also illustrated. These criteria permit the documents to be selected according to their status, in a manner similar to the Methodology documents of the Management database. Appendix D is a more detailed list of the Technical database views and the selection criteria for each view.

Each document has at least one field containing data that determine its view and selection criteria. As explained below, pre-programmed macros, such as those that are provided for changing a document's status, may be implemented by changing this data.

Notebook Initialization

The Management and Technical databases from database 11b may be copied to create project-specific databases. By working with copies from database 11b, the user ensures that database 11b remains generic and available for other projects. In other words, database 11b always contains "generic" databases that store only template forms and that are read-only. When the generic databases are copied, database 11b then stores the generic templates as well as maintains the project-specific copies.

Thus, to initialize a project notebook, a project manager makes project-specific copies of the Management and Technical databases, and gives the new databases a project identifier. Project members will access the project-specific databases by means of this identifier.

Next, the database manager defines the access control list (ACL). The ACL specifies which users, user groups, and servers have access to the project-specific database and what tasks these persons can perform. The access levels include manager, designer, editor, author, reader, depositor, and no access.

Another initialization step is-customization, using a Project Assignments form that prompts the user to enter project data. This form is contained in both the Management and the Technical databases. The data in a Project Assignments form may be shared by other documents, such as by means of database lookup programming.

FIG. 5 illustrates a portion of the Project Assignments document, accessed as a form in the Management database. Various sections of this form permit the user to enter various types of project assignments. A database identification section prompts the user to identify the locations of the databases in database 11b so that documents in one database can be accessed from another via a pre-programmed button, as discussed below.

In the portion of the Project Assignments document shown in FIG. 5, the user is viewing a table for entering project definitions. This table contains a row for Team. The user may select the Team box and enter the names of project members according to a prescribed formula.

Another example of shared data, which may be contained in the Project Assignments document, are various project role assignment fields. As explained in the following section, the notebook software uses these role assignments to implement project security.

Project Document Security

The notebook software contains pre-programmed formulas that determine which persons may access or enter data into which forms or sections of forms. In other words, document security is provided on a form-by-form basis.

To implement document security, an entire form, or a section of a form, may contain a security formula that controls access to that form (or section). These formulas are pre-programmed and are provided with the notebook software as part of its forms.

Document security is based on the project roles, whose assignment was discussed above in connection with project initialization. For example, a database manager may be designated for tasks such as initializing a project notebook and defining the access control list. A configuration manager may be designated for tasks involving document status, such as approval, baselining, and versioning. The security formulas determine whether a particular user has the role required for an action that user is attempting, such as accessing, editing, or approving a document.

An example of a security formula is a formula that accompanies a pre-defined Document Approval section of a form. This formula identifies which role a person must have to enter data in the approval section. Only persons who have been assigned to that role are allowed access to that section. Thus, for example, only persons who have been assigned the role of Customer may approve Approval Documents whose associated formulas require approval by Customers.

Methodology Documents and Document Status

As stated above, Methodology documents are pre-composed and provide a sequential outline for the project documentation. They are accessed via a Methodology selection of a View menu.

In the example of this description, where the project notebook is specifically designed for software development projects, Methodology documents comply with standardized software development methodology.

In the Management database, Methodology documents include a Statement of Work, Authorization to Proceed documents at various stages of the project, an Approach Document, a Software Project Plan, Software Quality Assurance Plan, a Software Configuration Management Plan, Test Report, Periodic Review, and Prototype Planning.

In the Technical database, Methodology documents include a Test Plan, A Training Analysis Document, a Software Requirements Specification, a Software Requirements Review, a Preliminary Design Review, A Software Design Document, an Installation and Support Plan, a Training Design Document, User Documentation, a Critical Design Review, System Test Procedures, Test Readiness Review, Production Readiness Review, Post-Installation Review, and Prototype Results.

Referring again to the Methodology views of FIGS. 3 and 4, Methodology documents have various selection criteria, four of which correspond to document statuses: Template, In Work, Pending Approval, and Baselined. A document with Template status is an empty form, waiting to be filled in. A document with In Work status is one that project members are actively working on. Any project member in the team shared field can edit documents with In Work status and can move a document from Template to In Work. A document with Pending Approval status is complete and waiting for approval by the appropriate persons. A document with Baselined status is one that all appropriate persons have approved. After a document has acquired this status, it can be changed only by creating a new version.

Figure 6:
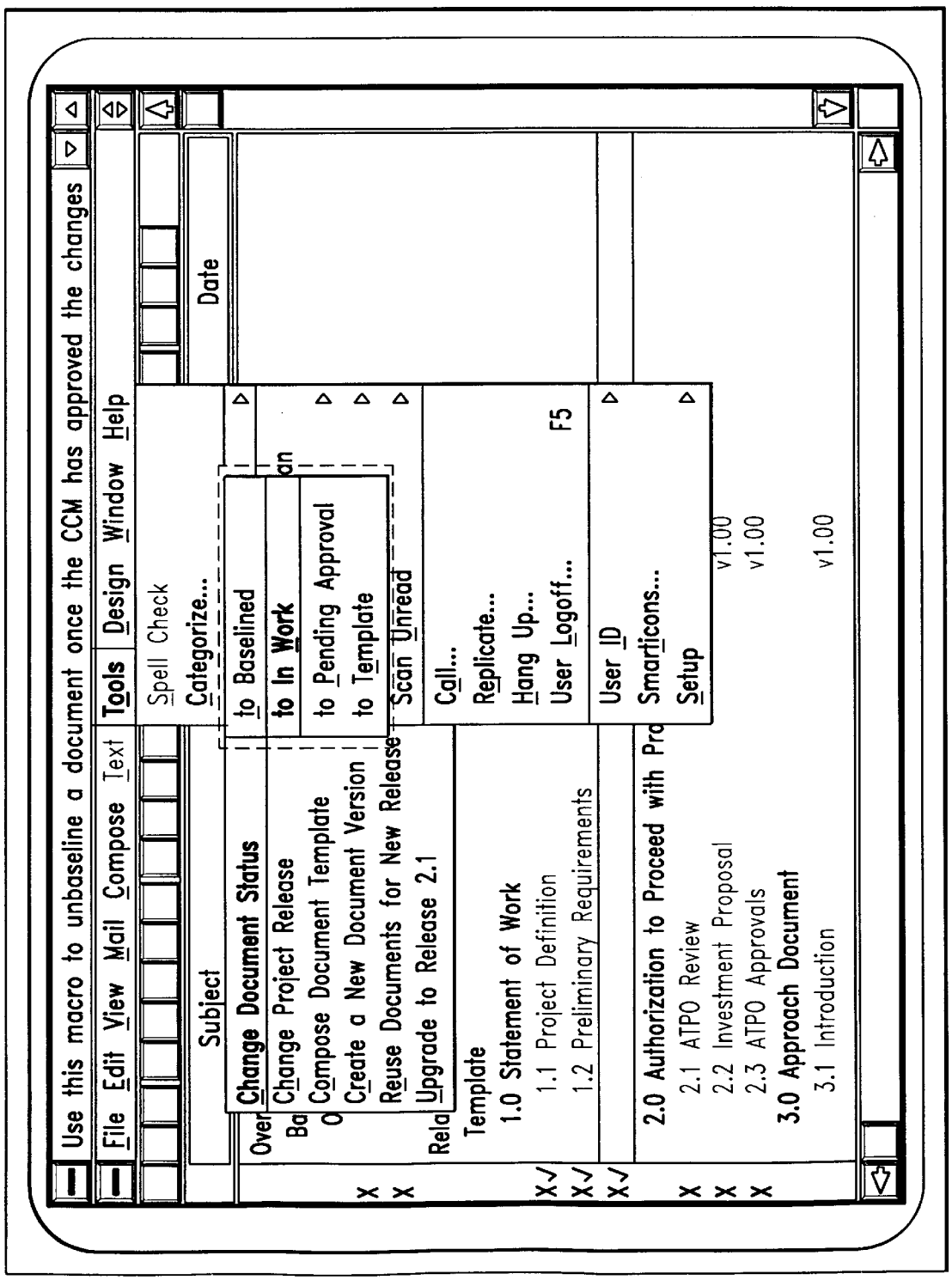
FIG. 6 illustrates how a change in document status is activated by the user.

FIG. 6 illustrates a display 60 of the user interface that permits the user to change status of a document. The user has made a View selection to access a list of documents. From this list, the user has selected a document whose status is to be changed. The user has then selected Tools from the menu bar, and has selected a Macros tool. A macros submenu displays a list of macros, from which the user selects Change Document Status. A next menu is of status choices, one of which is to be selected by the user. A macro that performs the change in status is part of the notebook software. In effect, the macro changes the data that identifies the selection criteria for the Methodology view.

A document's status may determine various security features, such as who can access or edit the document. For example, after a user changes a document's status to Pending Approval, a security formula in that document prevents unauthorized persons from altering the document while it awaits approval.

Methodology documents whose status has been changed to Pending Approval have a pre-programmed feature for automatically obtaining approval. Specifically, a pre-programmed Request Signatures button may appear in a Document Approval section of a Methodology document. If a user activates this button, the notebook process creates a Signature Request document that is sent to the required signatories. The Signature Request document prompts the signatories to review and approve the associated document. The signatory may access this document by activating a pre-programmed button. As explained below, document interconnectivity such as this is another feature of the notebook software.

Another feature of Methodology documents is a Software Project Plan that permits process variations to be documented. If the project is to deviate from a standardized process, a button in the Software Project Plan activates programming that composes a Variation form. This form documents the deviation and calls for appropriate approval.

Notebook Database Configuration

Database configuration tasks include preparing documents for electronic approval, baselining documents, and creating new document versions. A configuration manager may be designated to handle these tasks.

The configuration manager (or other authorized user) is permitted to change the status of a document to Pending Approval status and to edit a document with Pending Approval status. The configuration manager is also permitted to place a document in Baselined status. As explained above in connection with FIG. 6, a change in status is accomplished with a Change Document Status macro.

Similarly, a new version of a Baselined document may be created with a New Version macro. This macro copies an existing document into a new document and increments the document version number and assigns an In Work status. This permits users to create a modification of an existing Baselined document without altering that document.

Accessing Documents in the Notebook Databases

Documents may be accessed via a Views menu. The Views menu will provide a list of documents according to a selected criteria, and from this list a document can be selected and opened.

Figure 7:
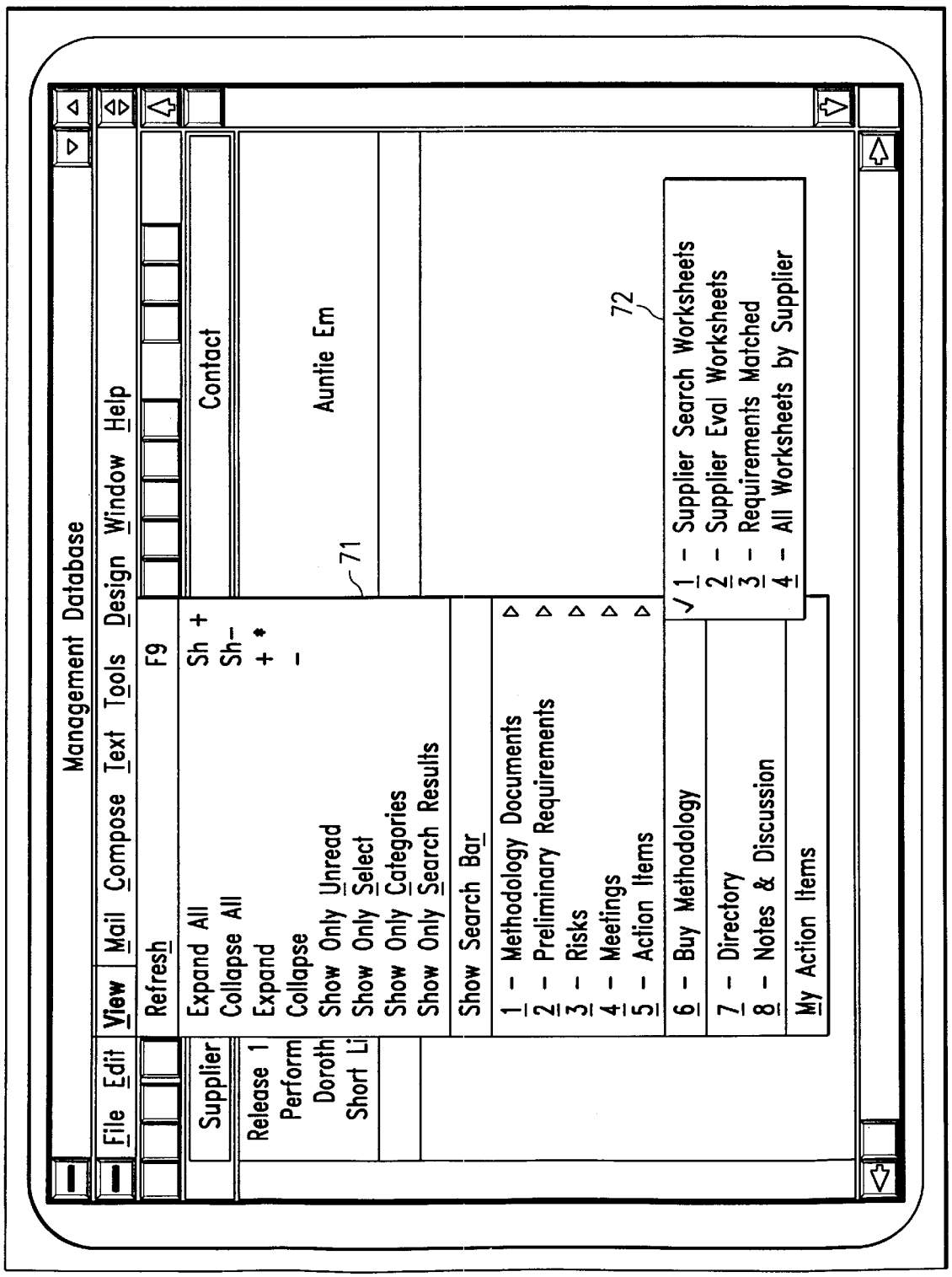
FIG. 7 illustrates a window for selecting documents with a Views menu.

FIG. 7 illustrates an example of a window 70 for selecting documents with the View menu. The user has opened the View menu 71 from the Management database. The user has selected the Buy Methodology category of documents by highlighting that line of the menu 71. A submenu 72 has appeared, from which the user may select a particular view.

Figure 8:
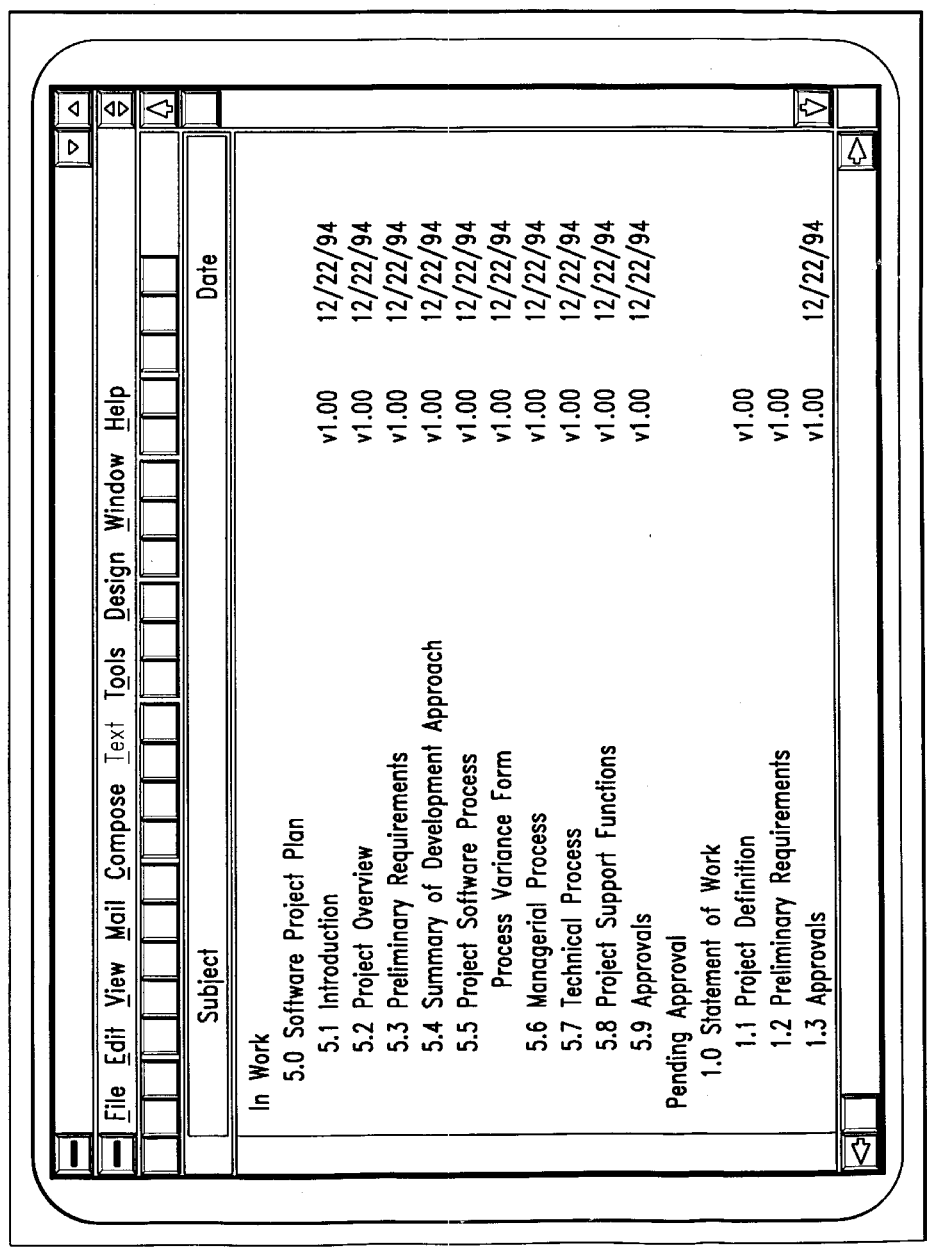
FIG. 8 illustrates a window listing documents in a particular view.

FIG. 8 illustrates the results of a user having selected a particular View from the View menu 71 or a submenu 72. A window 80 lists the documents in that View. In the example of FIG. 8, the documents are in the Methodology view, with the selection criteria being All Documents. Each document is listed with version and date information.

Interconnectivity of Databases

A feature of the invention is that a document can be accessed from other documents in the same database or in other databases in database 11b. This document interconnectivity is implemented with programming that provides pre-defined links.

An example of document interconnectivity was discussed above in connection with Methodology documents. A Request Signatures document permits access to a View containing one or more documents to be approved, via a pre-programmed button.

Another example of document interconnectivity is that provided when information required by one form has already been entered into another form. One example is in the case of Business Card documents. The Business Card document is in the Directory view of the Management database. When accessed, a Business Card form has fields for a person's name, telephone, title, and role. Business Card documents may be accessed from other document for the information contained in the Business Card documents. For example, a Risk form has an Analyst field. If a user desires to fill in the Analyst field, the user may activate the field (such as by clicking on the field with a pointing device), to which the notebook software responds with a dialog box with a list of persons having a Business Card. Analysts can be selected from this list.

Another example of "re-use" of information is in the case of a Requirements Review form in the Technical database. One field to be filled in is a Detailed Schedule. A Project Plan document also contains this field. When this field is to be filled into one of these documents, the notebook software provides this information to the user to be pasted into the other of these documents.

A further example of interconnectivity is the movement of data from one document to another in response to a status change. For example, the notebook process has a macro that a user may select to convert a Change Request document to a Detailed Requirements document after the Change Request document has acquired an approved status. Each view has a formula that determines which documents will appear in that view.

Notebook Trace Maps

Referring again to FIG. 4, one of the Technical database views is Trace Maps. The Trace Map view provides selection criteria that provide various trace maps. Appendix D, which lists all Technical database views, further describes the Trace Map view.

As an example of a trace map, a Preliminary Requirements to Detailed Requirements selection criteria may be used to show all preliminary requirements and their associated detailed requirements. As explained above, a field in a Detailed Requirements form points back to one or more Preliminary Requirements. More specifically, a Detailed Requirements form in the Technical database can be viewed from the Detailed Requirements view. The form has fields for various data, including the Preliminary Requirement from which it came.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

Appendix A

Management Database Forms 0.0 High-Level Documents\0.1 Division-Level Documents—A "bridge" document to take the user into the Division Documents database.

1.0 SOW—Statement of Work—this document is the first of the methodology documents designed to document the preliminary scope and description of the project. This document is made up of three separate templates:
  1.1 Project Definition—documents the business needs, customer profile, customer goals, critical constraints, project deliverables and "other" information.
  1.2 Preliminary Requirements—A "bridge" document to take the user into a view of all the documents which are preliminary requirements (see template below titled "2—Preliminary Requirement").
  1.3 Approvals—Automated and controlled signature form for required signoffs (generates a form called "Signature Request" shown below).

2.0 ATP0—Authorization to Proceed 0—this document records the senior executive review of approval to continue with the project through the planning phase. This document is made up of three separate templates:
  2.1 ATP0 Review—documents information needed to present in the review to senior management. This includes the SOW overview, plans and estimates for the remaining definition planning activities, costs and risks for remaining definition planning activities and for remainder of the project, and issues related to interfacing groups.
  2.2 Investment Proposal—A holder/pointer to the official form that is used to request money for the project.
  2.3 ATP0 Approvals—Automated and controlled signature form for required signoffs (generates a form called "Signature Request" shown below).

3.0 Approach Document—this document is the next methodology document designed to document the scope and description of the project. This is an expansion of the Statement of Work with the added sections of Alternative Analysis and project estimates. This document is made up of eight separate templates:
  3.1 Introduction—documents project overview and glossary items.
  3.2 Project Definition—documents the business needs, customer profile, customer goals, critical constraints, project deliverables and "other" information.
  3.3 Preliminary Requirements—A "bridge" document to take the user into a view of all the documents which are preliminary requirements (see template below titled "2—Preliminary Requirement").
  3.4 Alternative Analysis—documents the assumptions made during alternative analysis, the preferred alternative with risks and cost benefit analysis, and "other" information.
  3.5 Estimating Process—description of the process and assumptions used in creating the estimates for the project (included in the next form).
  3.6 WBS, Budget, & Schedule—details of the Work Breakdown Structure (task list), Budget required, and Schedule for the project. This may be a form linked into the Project Notebook from another product such as Microsoft Project or Project Workbench.
  3.7 Project Mgt Priorities—description of the project management's priorities for the project and long-range plans.
  3.8 Approval—Automated and controlled signature form for required signoffs (generates a form called "Signature Request" shown below).

4.0 ATP1—Authorization to Proceed 1—this document records the senior executive review of approval to continue with the project through the preliminary design phase. This document is made up of three separate templates:
  4.1 ATP1 Review—documents information needed to present in the review to senior management. This includes the preliminary requirements (A "bridge" button to take the user into a view of all the documents which are preliminary requirements (see template below titled "2—Preliminary Requirement")), Alternative Analysis Summary, Preferred Alternative and Benefits, Work Breakdown Structure, Cost Analysis, projected operating scenario, SCM Status, Installation/Deployment/Support issues, Milestones and schedule, capital and staffing needs, risk analysis (A "bridge"

button to take the user into a view of all the documents which are risk items (see template below titled "3—Risk Item")), Quality issues, Interfacing group issues, and "other" information.

4.2 Project Summary—A holder/pointer to the official form that is used to request additional money for the project once the project has begun.

4.3 ATP1 Approvals—Automated and controlled signature form for required signoffs (generates a form called "Signature Request" shown below).

5.0 Software Project Plan—this document is the next methodology document designed to document the specific process and management methods of the project. This is an expansion of the Statement of Work with the added sections of Software process, technical process, and support functions. This document is made up of nine separate templates:

5.1 Introduction—documents project overview and glossary items.

5.2 Project Overview—summary of the project definition from the Statement of Work.

5.3 Preliminary Requirements—A "bridge" document to take the user into a view of all the documents which are preliminary requirements (see template below titled "2—Preliminary Requirement").

5.4 Summary of Dvlpmnt App—summary of the approach to be taken in development of the product. This draws from the alternative analysis section of the Approach document and has a link to that document.

5.5 Project Software Process—describes the defined project software process and documents any process variances. For process variances a form is generated which must be approved.

5.6 Managerial Process—describes the organization structure and organization boundaries, the communication map, training required, reviews to be conducted, the estimation process, WBS and schedule and budget, how requirements will be managed, how risks will be managed, and the metrics plan for the project.

5.7 Technical Process—describes the technical methods that will be used (design methods, coding standards, methodologies, etc), test approach, tools used, documentation methods, process and product documents, user documents, and maintenance documents.

5.8 Project Support Functions—describes the approach to Software Quality Assurance and Software Configuration Management. Details of the SQA and SCM activities are documented in the appropriate plans outside this document (see templates below called "5.A SQA Plan" and "5.B SCM Plan").

5.9 Approvals—Automated and controlled signature form for required signoffs (generates a form called "Signature Request" shown below).

5.A SQA Plan—this document is a separate methodology document used as a supplement to the Software Project Plan. It is designed to document the specific details of the SQA analyst in assuring the process quality for this project effort. This document is made up of three separate templates:

5.A1 Introduction—documents the scope of the SQA plan, the resource requirements, and glossary.

5.A2 SQA Activities—describes the SQA's involvement in project planning, risk management, metrics, documentation, peer reviews, testing, technical and management reviews, process monitoring and verification, SQA records and reports, SCM, and supplier/subcontractor control.

5.A3 Approvals—Automated and controlled signature form for required signoffs (generates a form called "Signature Request" shown below).

5.B SCM Plan—this document is a separate methodology document used as a supplement to the Software Project Plan. It is designed to document the specific details of the SCM analyst in controlling the integrity of the software product during the project effort. This document is made up of three separate templates:

5.B1 Introduction—documents the scope of the SCM plan, the resource requirements, and glossary.

5.B2 SCM Activities—describes the SCM analysts involvement in/plan for methods of control (numbering strategies, tools used, etc), configuration control, status accounting, configuration validation, and subcontractor interaction.

5.B3 Approvals—Automated and controlled signature form for required signoffs (generates a form called "Signature Request" shown below).

6.0 ATP2—Authorization to Proceed 2—this document records the senior executive review of approval to continue with the project through the design, build, and test phases. This document is made up of three separate templates:

6.1 ATP2 Review—documents information needed to present in the review to senior management. This includes the project objectives, approach, customer base, intergroup coordination, benefits, system diagram, risk assessment, key milestone status, cost status, critical success factors, accomplishments, plans through the next review period, metrics, SQA comments, SCM status, issues, tailoring decisions, and the summary of results of the Preliminary Design Review. Also included are critical action items, requirement changes, risk plans, preliminary detailed schedule, replanning considerations, and interfacing group issues.

6.2 Project Summary—A holder/pointer to the official form that is used to request additional money for the project once the project has begun.

6.3 ATP2 Approvals—Automated and controlled signature form for required signoffs (generates a form called "Signature Request" shown below).

8.0 Test Report—this document is the next methodology document designed to document the specific results of the test phase of the project. This document is made up of four separate templates:

8.1 Introduction—identification of the product and the levels of testing conducted.

8.2 Summary—summary of the levels of testing and the general test results.

8.3 Test Deviations—identifies changes or additions to the test cases, a summary of all test cases that failed and their current disposition, a list of all change requests and results is attached to this document, and any test cases that were omitted and the reason.

8.4 Approvals—Automated and controlled signature form for required signoffs (generates a form called "Signature Request" shown below).

8.A Periodic Review—this document records the senior executive periodic review of the project when needed. This document is made up of two separate templates:

8.A1 Periodic Review—describes the project overview (objectives, approach, customer, intergroup coordination, benefits, system diagram), risk assessment, Milestone and cost status, critical success factors, accomplishments, plans, metrics, SQA comments, SCM status, issues, tailoring and deviations.

8. A2 Project Summary—A holder/pointer to the official form that is used to request additional money for the project once the project has begun.

9.0 ATP3—Authorization to Proceed 3—this document records the senior executive review of approval to continue with the project through the install and support phases. This document is made up of three separate templates:

9.1 ATP3 Review—documents information needed to present in the review to senior management. This includes the project objectives, approach, customer base, intergroup coordination, benefits, system diagram, risk assessment, key milestone status, cost status, critical success factors, accomplishments, plans through the next review period, metrics, SQA comments, SCM status, issues, tailoring decisions, risk analysis, customer acceptance, Pre-installation audit, Test Reports summary, installation and support plan, training plans, user documentation availability, conversion plans, target environment readiness, remaining issues, and interfacing group issues.

9.2 Project Summary—A holder/pointer to the official form that is used to request additional money for the project once the project has begun.

9.3 ATP3 Approvals—Automated and controlled signature form for required signoffs (generates a form called "Signature Request" shown below).

9.0 CUSSAT—this document is a single template that is used to conduct a customer satisfaction survey within 30 days following the implementation of a product.

A.0 Prototype Planning Document—this document is a supplemental methodology document designed to document the process used when a project conducts a prototype as part of their selected lifecycle (it is an optional document). This document is made up of five separate templates:

A.1 Scope—documents the problem to be resolved by prototyping, the reason that prototyping is being used, the long-term plan for the prototype and life expectancy of the prototype.

A.2 Resource Utilization Plan—documents the project team and customer involvement, the WBS and schedule for the prototyping effort, and the software and hardware required for the effort.

A.3 Stndrds, Procs, and Tools—documents the design standards, coding standards, documentation standards, and the SQA and SCM plans for the prototyping effort.

A.4 Validation Requirements—documents the criteria to be used to judge if the prototype is successful.

A.5 Approvals—Automated and controlled signature form for required signoffs (generates a form called "Signature Request" shown below).

Additional Misc. Documents—the following documents are supplemental to those described above. They work within the process but do not help define the process.

1—Document—a generic document that may be created to store miscellaneous information that the project team wishes to keep.

2—Preliminary Requirement—this form is used to create a documented requirement that is stored in the requirements portion of the database. The full list of these requirements can be viewed from a special view in the database and is accessible from several of the methodology documents described above. The form contains information about the status of the requirement, the target release for the requirement, the source of the requirement, the methodology that the requirement should show in, the text of the requirement, the type of requirement, the priority, and the customer acceptance criteria. A sequential number is automatically generated to enable tracking of multiple forms.

3—Risk Item—this form is used to document risks to the project and the mitigation plan for those risks. The full list of these risks can be viewed from a special view in the database and is accessible from most of the review templates described above. The form contains information about the originator of the risk, the product and release that it relates to, and a description of the risk. By entering in information about the category, impact, possibility of occurrence, and the status the system generates a severity code for the risk. A risk analysis is entered, the analyst assigned, the planned mitigation, the contingency plan, the coordinator and the resolution are available fields. A sequential number is automatically generated to enable tracking of multiple forms.

4—Meeting Agenda—this form is used to schedule and invite: people to a meeting. The form consists of meeting author, category of meeting, date, time, location, invitees, and agenda. The form allows you to send the agenda via e-mail to the invitees. Also, the form will automatically generate meeting minutes which will inherit the values from this form.

4—Meeting Minutes—this form is used to document the results of a meeting. The form consists of the meeting author, category of meeting, date, time, location, invitees, and minutes. The form allows you to send the minutes via e-mail to the attendees of the meeting. Also, the form will automatically create an action item (described, below) that has resulted from the meeting—if used in this way, the action item will inherit the values from the minutes form.

5—Action Item—this form is used to document action items that result from either meetings or outside of meetings. The form consists of author, meeting information (if generated from a meeting), action item text, assigned to person, project manager, due date, action item resolution status and date, and project manager approval. The form can be sent via e-mail to the assignee and/or the project manager. A sequential number is automatically generated to enable tracking of multiple forms.

6—Supplier Search Worksheet—this form is used to document if information relevant to potential suppliers of a product when a project team has decided to buy the solution (they are using a separate methodology called the "Buy Methodology"). The form consists of Supplier name, product name, supplier address and contact information, status of the vendor and the sources of information used on the vendor search, company information (sales, people employed, years established, etc), market presence information, a link to the requirements list that the vendor is meeting, risks, and a hot button to create a supplier evaluation worksheet (see below).

7—Business Card—this form is used to document information about the people involved in the project (the team, customers, managers, etc) The form consists of information about name, e-mail, ID, title, phone, beeper, division, department, role, and misc comments.

8—Notes—a generic form to allow users to enter and sort information related to a particular topic. The form documents the category, subject and the text. Separate views allow sorting and categorization of these notes.

8—Discussion—a generic form to allow users to enter into an electronic discussion about a topic. It is very similar to the "Notes" form above, but is designed specifically for discussions. The form documents the category and the subject and the text. Separate views allow sorting and categorization of these discussion topics.

9—Suggested Improvement—this form is a "bridge" document to take the user into a separate database to record their suggested improvement to the Project Notebook product.

A1 Msg Out—this form is an internal function form used to create and format a message from the Action Item document that can be sent via e-mail.

Approval Sheet—this form is created when a document requires a separate approval sheet and does not already have one (such as those methodology documents above).

Comment—this form is generated from the "8—Notes" form described above when someone presses a button on the form indicating that they would like to make a comment. This form allows them to enter a comment related to that "Notes" document.

Detailed Rqmt Match—this form is used internally and is generated from a button on the supplier worksheet form to allow the user to link a detailed requirement (from another database—the Project Notebook Technical Database) to this supplier evaluation.

Discussion\Response—this form is generated from the "8—Discussion" form described above when someone presses a button on the form indicating that they would like to make a response. This form allows them to enter a response to a discussion item.

Discussion\Response to response—this form is generated from the Discussion\Response" form described above when someone presses a button on the form indicating that they would like to make a response to the response.

Min MSG Out—this form is an internal function form used to create and format a message from the Meeting minutes document that can be sent via e-mail.

Preliminary Rqmt Match—this form is used internally and is generated from a button on the supplier worksheet form to allow the user to link a preliminary requirement to this supplier evaluation.

Process Variance Form—this form is used to document a process variance description when the project has decided to change the methodology they are using.

Project Assignments—this is an internal form that is used when the Project Notebook databases are first set up to create definitions that the system needs to function. It documents the location of the other databases that are used as interfaces and the roles of project team and customer members.

Risk MSG out—this form is an internal form used to create and format a message rom the risk document that can be sent as an MSG through the IMS system.

Sign Req Out—this form is an internal function form used to create and format a message from the signature request document that can be sent as an MSG through the IMS system.

Signature Request—this form is created when a button on the approval forms shown in several Methodology documents is pushed which says "Request Approval." This form is essentially a notification that is sent to required signature authorities that asks them to enter the Approval form and sign off on the documents. The form can be sent through e-mail If used through e-mail, the user can press a button on the form from within their mailbox that will take them directly to the required documents to be signed.

Supplier Eval Worksheet—this form is used to document the evaluation of the supplier. A worksheet is created which is filled out and weighted and rated to achieve a score for the supplier. The worksheet includes supplier information (financial history, parent history, market involvement, etc.), product information (products, evaluations, staffing, facilities, customer base, etc.), Architecture, Software engineering process, and status. The worksheet will calculate a score for the supplier based upon results in these areas.

Appendix B

Technical Database Documents 1.0 Test Plan—this document is designed to document the plan for conducting test on the product throughout the lifecycle of the project. This plan is developed during the planning and requirements phase of a project. This document is made up of five separate templates:

1.1 Introduction—documents the elements of the project to be tested, the objectives and approach to testing, and assumptions and constraints of testing.

1.2 Testing Rsrcs/Config Needs—documents the resources needed for testing, and the test environments to be used.

1.3 Software—documents the testing approach for regression testing, unit testing, integration testing, system testing, and acceptance testing.

1.4 Non-Software—documents the testing approach for non-software items (such as project documentation.

1.5 Approvals—Automated and controlled signature form for required signoffs (generates a form called "Signature Request" shown below).

2.0 TAD—Training Analysis Document—this document specifies the training analysis and approach for the project. This document is made up of nine separate templates:

2.1 Scope—documents the approach used to determine training requirements.

2.2 Training Team—documents the names of the people and organizations represented on the training team.

2.3 Target Audience Analysis—documents the summary of the target audience analysis.

2.4 Job Tasks Requiring Trng—documents the summary of the task analysis of job functions effected by the product.

2.5 Course Objectives—documents the performance objectives of the tasks and job functions identified in the job tasks requiring training section above.

2.6 Curriculum and Outline—documents the courses required for training and an initial outline of those courses.

2.7 Development Forecast—documents the forecast for the effort of creating training including size, effort, and cost forecasts.

2.8 Training Development—documents the detailed schedule for the design of training throughout the lifecycle of the development of the product.

2.9 Approvals—Automated and controlled signature form for required signoffs (generates a form called "Signature Request" shown below).

3.0 SRS—Software Requirements Specification—this document is designed to document the detailed requirements for the project effort. This document is made up of four separate templates:

3.1 Introduction—describes introductory information about the product including the problem statement, glossary, scope of product, benefits, and references.

3.2 General Description—documents the functionality of the product at a high level, description of the product's relationship to other existing or proposed systems, description of the product's functions, User profile, constraints, and assumptions and dependencies.

3.3 Detailed Requirements—A "bridge" document to take the user into a view of all the documents which are detailed requirements (see template below titled "2—Detailed Requirement").

3.4 Approvals—Automated and controlled signature form for required signoffs (generates a form called "Signature Request" shown below).

4.0 SRR—Software Requirements Review—this document records the review of requirements for the project to obtain agreement as to the requirements of the product. This document is made up of two separate templates:

4.1 SRR—documents the overall identification of the product, assumptions, a "hot link" to the list of detailed requirements, a listing of governing documents, the level of customer participation expected, the plans for management reviews and approvals, plans for software quality assurance, plans for software configuration management, an updated project schedule and resource requirement, deliverables related to support (training, support, maintenance, etc.), testing requirements, risk management plans, approvals required, action items and assignments to-date, and plans for prototyping (if applicable).

4.2 SRR Approvals—Automated and controlled signature form for required signoffs (generates a form called "Signature Request" shown below).

5.0 PDR—Preliminary Design Review—this document records the review of the preliminary design of the product. This document is made up of two separate templates:

5.1 Preliminary Design Review—documents the overview of the project, technical approach (top level design to meet the requirements), current risks and issues, design alternatives considered, results of prototyping, data flow documents, the physical data model, unique standards and naming conventions, common or reusable software components, buy vs. build alternatives, project metrics collected, deviations from the methodology, updated project schedule, testing requirements to date, software quality assurance issues, software configuration management issues, current action items and assignments. and compliance with the organization's technical architecture standards.

5.2 Approvals—Automated and controlled signature form for required signoffs (generates a form called "Signature Request" shown below).

6.0 SDD—Software Design Document—this document is the methodology document designed to document the detailed design of the project. This document is made up of eight separate templates:

6.1 Introduction—documents the scope of the document and glossary.

6.2 Design Constraints—documents the design constraints and standards governing this effort.

6.3 Design Approach—documents the design approach and tools used—much of this information will be used from the Preliminary Design Review document described above.

6.4 Top-Level Comp ID—documents the overall purpose of the system, description of the functions of the major components of the system, the data flow of the system, the tuning and control of functions regarding process and data flow, and a "hot link" to the trace map of functional component to functional requirement.

6.5 External Interface Design—documents any interfaces that are external to the system.

6.6 Detailed Design—A "bridge" document to take the user into a view of all the documents which are detailed design (see template below titled "3—Design Document").

6.7 Risks and Issues—documents the risks associated with design.

6.8 Approvals—Automated and controlled signature form for required signoffs (generates a form called "Signature Request" shown below).

7.0 Installation & Support Plan—this document is the methodology document designed to document the requirements for installing and supporting the product. This document is made up of twelve templates.

7.1 Introduction—documents the scope of the document, glossary, and the mechanism for documenting systems documents.

7.2 Deployment—documents organizational and procedural changes required in the customers environment, and the fanout strategy for the product.

7.3 Installation Information—documents installation objectives and schedules, installation procedure or checklist, and other installation requirements for interfacing items.

7.4 Conversion Information—documents instructions for converting from old to new system.

7.5 Maintenance—documents internal support tools, maintenance functions, batch processing activities, inquiries, naming conventions, communications map, test environment, and distribution plan for software work products.

7.6 Key Elements—documents specific database information, and CASE model information.

7.7 Interfaces—documents internal and external interfaces.

7.8 Report Distribution—documents methods used to distribute reports, and special customer reporting mechanisms.

7.9 Security Systems—documents the security system and security levels being used.

7.a System Mod Procedures—documents procedures for modifying the system, acquiring and changing system software, tools that are used to compile and link the system, specific computer version and linker versions.

7.b Disaster Recovery Plan—documents the disaster recovery plan including the business impact analysis, critical needs and priorities, and recovery strategies.

7.c Approvals—Automated and controlled signature form for required signoffs (generates a form called "Signature Request" shown below).

7.0 TDD—Training Design Document—this document is the methodology document designed to document the training that has been designed to satisfy the requirements outlined in the Training Analysis Document described above. This document is made up of twelve templates:

7.1 Target Audience Updates—documents and enhanced view of the target audience and task analysis from the TAD.

7.2 Revised Course Outlines—documents the revised outlines of the classes needed to meet the requirements defined in the TAD.

7.3 Sub-Level Objectives—documents the Learning Objectives that support the detailed course outlines.

7.4 Method of Presentation—documents the instructional strategies to be used to conduct the training.

7.5 Delivery Medium—documents the delivery medium and the rationale for selection of this medium.

7.6 Sample Lesson—documents a completely developed sample lesson using the selected method of presentation and delivery medium.

7.7 Training Evaluation—documents the way in which the training will be evaluated for effectiveness 7.8 Sum of Trng Deliverables—documents all student and instructor print, visual and audio deliverables.

7.9 Dvlpmnt Responsibilities—documents the organizations and individuals responsible for developing the training.

7.a Revised Cost Forecast—documents the updates to the cost forecasts to develop the training.

7.b Revised Training—documents the detailed schedule of the tasks and activities to develop the training.

7.c Approvals—Automated and controlled signature form for required signoffs (generates a form called. "Signature Request" shown below).

8.0 USD—User Documentation—this document is designed to document the plans for creating user documentation to support the product. This document is made up of eight separate templates:

8.1 Introduction—documents the purpose of the documentation and the system.

8.2 Sys Functions and Benefits—documents the benefits of the system and the features of the product.

8.3 Installation and Set Up—documents the installation procedures for the customer if the customer sets up the system.

8.4 User Instructions—documents instructions for the use of the system.

8.5 System Messages—documents an explanation for each system message.

8.6 Glossary—documents the definitions of acronyms and terms unfamiliar to the user.

8.7 Index—documents an index to the user documentation for the user.

8.8 Approvals—Automated and controlled signature form for required signoffs (generates a form called. "Signature Request" shown below).

9.0 CDR—Critical Design Review—this document records the review of the detailed design of the product being built.

9.1 Critical Design Review—documents the project status, the technical approach, the major software components, functional control and data flow, the sub-component identification, database design, error handling and recovery strategy, data integrity issues, affects of modification activity, growth rate, response time, test plan, preliminary user documentation, preliminary installation and support plan, risks and issues, common/reusable software, deviations, project schedule, interfacing status, project metrics, SQA issues, SCM issues, Approval of the completed Software Design Document, Approval of the completed Test Plan, Verbal approval of the preliminary user documentation, Verbal approval of the preliminary Installation and Support Plan, Approval of the completed Training Design Document, Approval of the Software Requirement Specification changes, and current action items and assignments 9.2 Approvals—Automated and controlled signature form for required signoffs (generates a form called "Signature Request" shown below).

A.0 TPR—System Test Procedures—this document is designed to document the plans for system testing. This document is made up of three separate templates:

A.1 Scope—documents the level of testing to be included in the test procedure (unit, integration, system, acceptance).

A.2 Detailed Test Procedures—A "bridge" document to take the user into a view of all the documents which are test procedures (see template below titled "5—Test Procedure").

A.3 Approvals—Automated and controlled signature form for required signoffs (generates a form called "Signature Request" shown below).

B.0 TRR—Test Readiness Review—this document records the review prior to entering the test phase of the project.

B.1 Test Readiness Review—documents an overview and status of the project, overview of requirements, trace map, testing coverage, status of risks, status of action items, review of test plan, overview of unit and integration testing results, review of test cases, review of user documentation status, detailed test schedule, overview of SCM status, review of Installation and Support Plan, testing time allocated, testing data collection, testing participants, approval of the plans for system testing, approval of the User Documentation, approval of the Installation and Support Plan, and consensus to proceed with system and acceptance testing.

B.2 Approvals—Automated and controlled signature form for required signoffs (generates a form called "Signature Request" shown below).

C.0 PRR—Production Readiness Review—this document records the review prior to product installation.

C.1 Pre-installation Checklist—this document is a template that is used by the SQA to conduct a pre-installation checklist audit prior to installation to determine the readiness of the product. The areas audited include: documentation, project reviews, validation/testing, configuration control, training, and installation. Included in this checklist is an automated and controlled signature form for required signoffs (generates a form called "Signature Request" shown below).

C.2 Production Readiness Rvw—documents the results of the Pre-Installation Checklist, action items from testing, test report, change request disposition, status of project documentation, configuration identification list, installation plans, schedule and distribution of training, status of disaster recovery plans, and risk analysis status.

C.3 Approvals—Automated and controlled signature form for required signoffs (generates a form called "Signature Request" shown below).

D.0 PIR—Post-Installation Review—this document records the review conducted once the product is installed.

D.1 Post-Installation Review—documents project summary, major successes and problems (process), major successes and problems (product/customer), evaluation of the SPP execution (process), evaluation of programming languages, tools, DBMS process, and platforms, review the effectiveness of tailoring, summary of metrics collected, action items to enable successes to be repeated, assurance that all action items are assigned and tracked to closure, identified quality and SEPG information to share, and a review the PIR process.

D.2 Approvals—Automated and controlled signature form for required signoffs (generates a form called "Signature Request" shown below).

F.0 Prototype Results Document—documents the results of prototyping if the project has followed a prototyping methodology.

F.1 Scope—documents the problem being solved and the results of the prototyping effort.

F.2 Recommendations & Plans—documents the recommended disposition (throw it away; build on it with another development project; document, test, enhance, and install into production; or incorporate into a higher level project) and plans based on the results of the prototyping effort.

F.3 Approvals—Automated and controlled signature form for required signoffs (generates a form called "Signature Request" shown below).

Additional Misc. Documents—the following documents are supplemental to those described above. They work within the process but do not help define the process.

1—Document—a generic document that may be created to store miscellaneous information that the project team wishes to keep.

2—Detailed Requirement—this form is used to create a documented requirement that is stored in the detailed requirements portion of the database. The full list of these requirements can be viewed from several special views in the database and is accessible from several of the-methodology documents described above. The form contains information about the target release, preliminary requirement that the detailed requirement is based from, requirement type, customer priority, detailed description, work estimate, status, CFG priority, rank, the name of the person who is assigned to implement the requirement, the design document(s) that are associated with the requirement, and the test case(s) used to test the requirement. A sequential number is automatically generated to enable tracking of multiple forms.

3—Design Document—this form is used to create a documented design that is stored in the design documents portion of the database. The full list of these design documents can be viewed from several special views in the database and is accessible from several of the methodology documents described above. The form contains the target release, status, preliminary requirement that the design document is based from, sub-category, design type, detailed design, and the name of the person who is assigned to complete the design. A sequential number is automatically generated to enable tracking of multiple forms.

4—Test Case—this form is used to create documented test cases that are stored in the design documents portion of the database. The full list of these test cases can be viewed from several special views in the database and is accessible from several of the methodology documents described above. The form contains the status, release, preliminary requirement that the test case will test, sub-category, test level, disposition. test type, last test date, test results, test order, last release tested, testing configuration/resources, assumptions/constraints, inputs, test description, outputs, test procedure(s) that this test case uses, and the name of the person who is assigned to run the test case. A sequential number is automatically generated to enable tracking of multiple forms.

5—Test Procedure—this form is used to create documented test procedures that are stored in the test procedure portion of the database. The full List of these test procedures can be viewed from several special views in the database and is accessible from several of the methodology documents described above. The form contains the status, release, preliminary requirement that the test procedure will test, sub-category, testing configuration/resources, assumptions, constraints, inputs, procedure description, and outputs.

7—Notes—a generic form to allow users to enter and sort information related to a particular topic. The form documents the category, subject and the text. Separate views allow sorting and categorization of these notes.

8—Suggested Improvement—this form is a "bridge" document to take the user into a separate database to record their suggested improvement to the Project Notebook product.

Approval Sheet—this form is created when a document requires a separate approval sheet and does not already have one (such as those methodology documents above).

Comment—this form is generated from any form in the database when someone presses an "Attach Comment" button on the farm indicating that they would like to make a comment. This form allows them to enter a comment related to that document.

CR notification—this form is not actively used in the system. It was intended to be used to create "document change requests." The team decided to use ONE change request form for all requests (hardware, software, and documentation).

Project Assignments—this is an internal form that is used when the Project Notebook databases are first set up to create definitions that the system needs to function. It documents the location of the other databases that are used as interfaces and the roles of project team and customer members.

SCR PGMR notification—this form is not actively used in the system. It was intended to be used to create mail change requests to the person who was assigned to implement the request.

SCR SCM notification—this form is not actively used in the system. It was intended as a reminder for the SCM to present the change request to the Configuration Control Board during a CCB meeting.

Sign Req Out—this form is an internal function form used to create and format a message from the signature request document that can be sent as an MSG through the IMS system.

Signature Request—this form is created when a button on the approval forms shown in several Methodology documents~pushed which says "Request Approval." This form is essentially a notification that is sent to required signature authorities that asks them to enter the Approval form and sign off on the documents. The form can be sent through IMS or through Lotus Notes Mail—if used through Lotus Notes Mail, the user can press a button on the form from within their own Notes Mailbox that will take them directly to the required documents to be signed.

ATTORNEY'S DOCKET  
TI-20119  
(032350.A373)

PATENT APPLICATION

Appendix C

Management Database Views

| View | Description |
|---|---|
| 1 - Methodology Documents | |
| 1 - In Work | Lists current versions of all Methodology Documents that are designated as "In Work" in the Configuration Management section at the bottom of the document. |
| 2 - Pending Approval | Lists current versions of all Methodology Documents that are designated as "Pending Approval" in the Configuration Management section at the bottom of the document. |
| 3 - Baselined | Lists current versions of all Methodology Documents that are designated as "Baselined" in the Configuration Management section at the bottom of the document. |

ATTORNEY'S DOCKET  
TI-20119  
(032350.A373)

PATENT APPLICATION

| View | Description |
|---|---|
| 4 - All Documents | Lists the most current version of any document that is configuration controllable (e.g., Statement of Work, Preliminary Requirements, etc.). |
| 5 - Template | Lists all Methodology Documents that are designated as "Template" in the Configuration Management section at the bottom of the document. |
| 6 - All Versions | Lists all versions of any document that is configuration controllable (e.g., Statement of Work, Preliminary Requirements, etc.). Prior versions are annotated with an 'X' in the 'Prior Version?' column. |
| 2 - Preliminary Requirements | |

ATTORNEY'S DOCKET　　　　　　　　　　　　　　　PATENT APPLICATION
TI-20119
(032350.A373)

| View | Description |
|---|---|
| 1 - by Status | Lists current versions of all Preliminary Requirements categorized by preliminary requirement number. |
| 2 - by Preliminary Rqmt Number | Lists current versions of all Preliminary Requirements categorized by preliminary requirement number. |
| 3 - by Customer Priority | Lists current versions of all Preliminary Requirements categorized by customer priority. |
| 4 - by Requirement Type | Lists current versions of all Preliminary Requirements categorized by requirement type. |
| 5 - in Statement of Work | Lists current versions of all Preliminary Requirements incorporated into the Statement of Work outline. |
| 6 - in Approach Document | Lists current versions of all Preliminary Requirements incorporated into the Approach Document outline. |

AUS01:94714.1
032350.A373

| View | Description |
|---|---|
| 7 - in Software Project Plan | Lists current versions of all Preliminary Requirements incorporated into the Software Project Plan outline. |
| 3 - Risks | |
| 1 - by Status | Lists all risks categorized by status. |
| 2 - by Severity | Lists all risks categorized by severity. |
| 3 - by Impact | Lists all risks categorized by impact. |
| 4 - by Occurrence | Lists all risks categorized by occurrence. |
| 5 - by Number | Lists all risks categorized by number |
| 6 - by Analyst | Lists all risks categorized by assigned analyst. |
| 7 - by Coordinator | Lists all risks categorized by coordinator. |
| 8 - by Project Release | Lists all risks categorized by project release. |
| 4 - Meetings | |

| View | Description |
|---|---|
| 1 - by Category | Lists all meeting agendas, meeting minutes, and action items RESULTING from meetings categorized by category (type of meeting). |
| 2 - by Date | Lists all meeting agendas, meeting minutes, and action items RESULTING from meetings categorized by meeting date. |
| 3 - by Topic | Lists all meeting agendas, meeting minutes, and action items RESULTING from meetings categorized by meeting topic. |
| 5 - Action Items | |
| 1 - by Assigned To | Lists all action items categorized by the person assigned the action. |
| 2 - by Status | Lists all action items categorized by status. |
| 3 - by Due Date | Lists all action items categorized by due date. |

ATTORNEY'S DOCKET  
TI-20119  
(032350.A373)

PATENT APPLICATION

| View | Description |
|---|---|
| 4 - by Overdue | Lists all overdue action items. |
| 5 - by Category | Lists all action items categorized by category (type of action item). |
| 6 - by Number | Lists all action items categorized by the assigned number of the action item. |
| 7 - by Approval Status | Lists all action items categorized by approval status. |
| 6 - Buy Methodology | |
| 1 - Supplier Search Worksheets | Lists all Supplier Search Worksheets categorized by status. |
| 2 - Supplier Eval Worksheets | Lists all Supplier Evaluation Worksheets categorized by status. |
| 3 - Requirements Matched | Lists all requirements matched along with the supplier(s) that matches the requirement(s). |

ATTORNEY'S DOCKET  
TI-20119  
(032350.A373)

PATENT APPLICATION

| View | Description |
|---|---|
| 4 - All Worksheets by Supplier | Lists all Buy Methodology worksheets categorized by supplier in the following order:<br>Supplier Search Worksheet<br>Requirement X Matched<br>Requirement Y Matched<br>:<br>Supplier Evaluation Worksheet |
| 7 - Directory | |
| 1 - Project Team | Lists people designated as "Project Team Members" on the Business Card form. |
| 2 - Management | Lists people designated as "Management" on the Business Card form. |
| 3 - Configuration Control Board | Lists people designated as "CCB Members" on the Business Card form. |
| 4 - All Entries | Lists all people who have Business Card forms entered. |
| 8 - Notes and Discussion | |

ATTORNEY'S DOCKET
TI-20119
(032350.A373)

PATENT APPLICATION

70

| View | Description |
|---|---|
| 1 - Note by Author | Lists all notes categorized by document author. |
| 2 - Notes by Category | Lists all notes categorized by category (type of note). |
| 3 - Notes by Date | Lists all notes categorized by date composed. |
| 4 - Discussion by Author | Lists all discussion topics and responses categorized by the author of the original discussion topic. |
| 5 - Discussion by Category | Lists all discussion topics and responses categorized by category (type of discussion). |
| 6 - Discussion by Date | Lists all discussion topics and responses categorized by date composed. |

AUS01:94714.1
032350.A373

ATTORNEY'S DOCKET
TI-20119
(032350.A373)

PATENT APPLICATION

Appendix D

Technical Database Views

| View | Description |
| --- | --- |
| 1 - Methodology Documents | |
| 1 - In Work | Lists current versions of all Methodology Documents that are designated as "In Work" in the Configuration Management section at the bottom of the document. |
| 2 - Pending Approval | Lists current versions of all Methodology Documents that are designated as "Pending Approval" in the Configuration Management section at the bottom of the document. |
| 3 - Baselined | Lists current versions of all Methodology Documents that are designated as "Baselined" in the Configuration Management section at the bottom of the document. |

| View | Description |
|---|---|
| 4 - All Documents | Lists the most current version of any document that is configuration controllable (e.g., Test Plan, Detailed Requirements, Test Cases, etc.). |
| 5 - Template | Lists all Methodology Documents that are designated as "Template" in the Configuration Management section at the bottom of the document. |
| 6 - All Versions | Lists all versions of any document that is configuration controllable (e.g., Test Plan, Detailed Requirements, Test Cases, etc.). Prior versions are annotated with an 'X' in the 'Prior Version?' column. |
| 2 - Detailed Requirements | |
| 1 - by Status | Lists current versions of all Detailed Requirements categorized by status. |

ATTORNEY'S DOCKET
TI-20119
(032350.A373)

PATENT APPLICATION

73

| View | Description |
|---|---|
| 2 - by Preliminary Requirement | Lists current versions of all Detailed Requirements categorized by preliminary requirement. |
| 3 - by Requirement Number | Lists current versions of all Detailed Requirements categorized by detailed requirement number. |
| 4 - by Requirement Type | Lists current versions of all Detailed Requirements categorized by requirement type. |
| 5 - by Priority & Rank | Lists current versions of all Detailed Requirements categorized by priority and subcategorized by rank. |
| 6 - by Requested By | Lists current versions of all Detailed Requirements categorized by requester. |
| 7 - by Assigned To | Lists current versions of all Detailed Requirements categorized by the person assigned to work the requirement. |

AUS01:94714.1
032350.A373

ATTORNEY'S DOCKET  
TI-20119  
(032350.A373)

PATENT APPLICATION

| View | Description |
|---|---|
| 8 - in Software Rqmt Spec (SRS) | Lists current versions of all Detailed Requirements incorporated into the SRS outline. |
| 3 - Design | |
| 1 - by Status | Lists current versions of all design documents categorized by status. |
| 2 - by Preliminary Requirement | Lists current versions of all design documents categorized by preliminary requirement. |
| 3 - by Design Number | Lists current versions of all design documents categorized by design number. |
| 4 - by Design Type | Lists current versions of all design documents categorized by design type. |
| 5 - in Software Design Doc | Lists current versions of all design documents incorporated into the Software Design Document outline. |

| View | Description |
|---|---|
| 6 - by Assigned To | Lists current versions of all design documents categorized by the person assigned to work the design. |
| 4 - Test Cases | |
| 1 - by Status | Lists current versions of all test cases categorized by status. |
| 2 - by Preliminary Requirement | Lists current versions of all test cases categorized by preliminary requirement. |
| 3 - by Test Case Number | Lists current versions of all test cases categorized by test case number. |
| 4 - Test Level | Lists current versions of all test cases categorized by test level. |
| 5 - Disposition | Lists current versions of all test cases categorized by disposition. |
| 6 - Type | Lists current versions of all test cases categorized by type. |

| View | Description |
|---|---|
| 7 - Assigned To | Lists current versions of all test cases categorized by the person assigned the test case. |
| 8 - Last Tested | Lists current versions of all test cases categorized by the date the test case was last run. |
| 9 - in Test Plan | Lists current versions of all test cases incorporated into the Test Plan outline. |
| 5 - Test Procedures | |
| 1 - by Status | Lists current versions of all test procedures categorized by status. |
| 2 - by Preliminary Requirement | Lists current versions of all test procedures categorized by preliminary requirement. |
| 3 - by Test Procedure Number | Lists current versions of all test procedures categorized by test procedure number. |

ATTORNEY'S DOCKET  
TI-20119  
(032350.A373)

PATENT APPLICATION

| View | Description |
|---|---|
| 4 - in System Test Procedures | Lists current versions of all test procedures incorporated into the System Test Procedure document. |
| 6 - Change Requests | |
| 1 - by Status | Lists all change requests categorized by status. |
| 2 - by Preliminary Requirement | Lists all change requests categorized by preliminary requirement. |
| 3 - by Number | Lists all change requests categorized by number. |
| 4 - Type | Lists all change requests categorized by type. |
| 5 - Priority & Rank | Lists all change requests categorized by priority and subcategorized by rank. |
| 6 - Reported By | Lists all change requests categorized by reported by. |
| 7 - Assigned To | Lists all change requests categorized by assigned to. |
| 7 - Trace Maps | |

| View | Description |
|---|---|
| 1 - Prelim Rqmt → Detailed Rqmt | Lists preliminary requirements with all associated detailed requirements |
| 2 - Detailed Rqmt → Design Doc | Lists detailed requirements with all associated design documents. |
| 3 - Detailed Rqmt → Test Case | Lists detailed requirements with all associated test cases. |
| 4 - Test Case → Test Procedure | Lists test cases with all associated test procedures. |
| 5 - Detailed Rqmt → Prelim Rqmt | Lists detailed requirements with all governing preliminary requirements. |
| 6 - Design Doc → Detailed Rqmt | Lists design documents with all governing detailed requirements. |
| 7 - Test Case → Detailed Rqmt | Lists test cases with all governing detailed requirements. |
| 8 - Test Procedure → Test Case | Lists test procedures with all governing test cases. |
| 8 - Notes | |

ATTORNEY'S DOCKET  
TI-20119  
(032350.A373)

PATENT APPLICATION

| View | Description |
|---|---|
| 1 - by Author | Lists all notes categorized by document author. |
| 2 - by Category | Lists all notes categorized by category (type of note). |
| 3 - by Date | Lists all notes categorized by date composed. |

What is claimed is:

1. A method of providing a computer-aided project notebook for software development, for use with collaboration software, comprising the steps of:

creating a management document database and a technical document database, said management document database and technical document database storing pre-composed forms for documents to be completed by one or more users, said databases comply with software development methodology and provide a sequential outline for the software project documentation, each of said forms having a view field that identifies a view for that form and a selection criteria field that identifies selection criteria for the view associated with that form;

wherein at least one said view is a software development methodology view having document status selection criteria, and wherein one or more of said forms has a status field operable to receive document status data from said user; and providing programming for said collaboration software, said programming operable to automatically update said status field in response to said document status data.

2. The method of claim 1, further comprising the step of providing user-composed forms to be retrieved from said database in response to a selection by said user from compose menu.

3. The method of claim 2, wherein user-composed forms and said pre-composed forms have a many-to-one relationship.

4. The method of claim 2, wherein each said user-composed form has said view field and selection criteria field.

5. The method of claim 1, wherein at least one of said forms has a section accessible only if an associated formula is satisfied said formula operable to determine whether said user has a certain project role.

6. The method of claim 1, further comprising the step of providing programming for a display that prompts a user to enter a request for signatures for a document and that generates a signature request document in response to said request for approval.

7. The method of claim 1, further comprising the step of providing programming operable to create a new version of an existing document.

8. The method of claim 1, further comprising the step of providing programming for automatically accessing a first of said forms from a second of said forms.

9. The method of claim 8 wherein said second of said forms contains project member data.

10. The method of claim 8 wherein said first of said forms is a form to be approved and said second of said forms is a request for approval form.

11. The method of claim 10 wherein one of said forms is a change request form having a change request view and further comprising the step of providing programming for converting said change request form to a requirements form having a requirements view.

12. The method of claim 1, wherein at least one of said forms is a preliminary requirements form and another of said forms is a detailed requirement form, and wherein one of said views is a trace map view, and further comprising the step of providing programming that displays a requirements trace map in response to said user having selected said trace map view.

13. The method of claim 1, wherein said management database methodology documents include statement of work, authorization to proceed documents at various stages of the project, an approach document, a software project plan, software quality assurance plan, a software configuration management plan, test report, periodic review and prototype planning.

14. The method of claim 1, wherein said technical database methodology document includes a test plan, a training analysis document, a requirement review, a preliminary design review, a software design document, an installation and support plan, a training design document, user documentation, a critical design review, system test procedures, test readiness review, production readiness review, post-installation review and prototype results.

15. The method of claim 1, wherein said status selection criteria includes in-work and pending approval.

* * * * *